United States Patent
Kruckemyer et al.

(10) Patent No.: US 12,481,310 B2
(45) Date of Patent: Nov. 25, 2025

(54) METHOD AND APPARATUS FOR DESKEWING DIE TO DIE COMMUNICATION BETWEEN SYSTEM ON CHIP DEVICES

(71) Applicant: Ventana Micro Systems Inc., Cupertino, CA (US)

(72) Inventors: David A. Kruckemyer, San Francisco, CA (US); John G. Favor, San Francisco, CA (US); Kelvin D. Goveas, Austin, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 60 days.

(21) Appl. No.: 18/219,505

(22) Filed: Jul. 7, 2023

(65) Prior Publication Data

US 2024/0118726 A1 Apr. 11, 2024

Related U.S. Application Data

(60) Provisional application No. 63/359,755, filed on Jul. 8, 2022.

(51) Int. Cl.
*G06F 1/12* (2006.01)
*G06F 1/10* (2006.01)

(52) U.S. Cl.
CPC . *G06F 1/12* (2013.01); *G06F 1/10* (2013.01)

(58) Field of Classification Search
CPC ........ G06F 1/12; G06F 1/10; G06F 2207/388; G06F 11/2082; G06F 13/1689; G06F 15/17325
See application file for complete search history.

(56) References Cited

U.S. PATENT DOCUMENTS

| | | | |
|---|---|---|---|
| 6,724,328 B1 * | 4/2004 | Lui | H03M 9/00 341/101 |
| 7,106,098 B1 * | 9/2006 | Zack | H03K 19/1776 326/46 |
| 7,366,935 B1 * | 4/2008 | Swenson | G06F 5/14 713/400 |
| 7,573,770 B1 * | 8/2009 | Zhang | G06F 5/06 365/221 |
| 9,330,740 B1 * | 5/2016 | Baeckler | G11C 7/222 |

(Continued)

*Primary Examiner* — Hyun Soo Kim
(74) *Attorney, Agent, or Firm* — Gary Stanford; Huffman Law Group, PC

(57) ABSTRACT

A die-to-die (D2D) interface between chiplets of a system on a chip (SoC) in which each of the chiplets are subdivided into slices. The D2D interface includes a transmission interface coupled between first and second chiplets, which includes a first transmission path for a first slice and a second transmission path for a second slice. The first chiplet includes receive circuitry which further includes a write interface and a read interface. The write interface stores data received from the first transmission path into a first FIFO using a first clock signal received via the first transmission path, and stores data received from the second transmission path into a second FIFO using a second clock signal received via the second transmission path. The read interface reads data stored in the first and second FIFOs using the first clock signal. The first and second transmission paths may be subject to different delays.

20 Claims, 8 Drawing Sheets

(56) References Cited

U.S. PATENT DOCUMENTS

| | | | |
|---|---|---|---|
| 2002/0146023 A1* | 10/2002 | Myers | H04L 47/2416 |
| | | | 370/537 |
| 2006/0117202 A1* | 6/2006 | Magklis | G06F 1/3203 |
| | | | 713/400 |
| 2008/0028252 A1* | 1/2008 | Vera | G06F 1/12 |
| | | | 713/503 |
| 2010/0164941 A1* | 7/2010 | Chae | H04B 15/02 |
| | | | 345/99 |
| 2016/0329085 A1* | 11/2016 | Yu | G11C 7/222 |

* cited by examiner

METHOD AND APPARATUS FOR DESKEWING DIE TO DIE COMMUNICATION BETWEEN SYSTEM ON CHIP DEVICES

CROSS REFERENCE TO RELATED APPLICATION(S)

This application claims priority to U.S. Provisional Application Ser. No. 63/359,755 (VENT.0167) filed Jul. 8, 2022 which is hereby incorporated by reference in its entirety.

BACKGROUND

A System on a Chip (SoC) device may include multiple chiplets that communicate with each other. Each chiplet may include multiple slices of the same size (e.g., 16-bit slices) which operate substantially independently from each other. Each slice has a separate clock synchronized with corresponding data, and the propagation of the clock and data on one slice may be skewed relative to the clock and data on other slices based on variations in process, temperature, voltage, signal routing, etc. Certain factors, such as process and signal routing and the like, may cause static or non-varying skew variations for a given manufactured configuration, while other factors, such as variations in temperature and voltage and the like, may cause dynamic skew variations over time. Even when the separate clocks are derived from a single clock source of the SoC, a clock distribution network invariably incurs separate static and dynamic delays from the common clock source to each clock. Clock and data transmission from one chiplet to another exhibits skew variation between different slices causing misalignment of data that may result in erroneous operation.

SUMMARY

A die-to-die (D2D) interface between chiplets of a system on a chip (SoC) is disclosed, in which each of the chiplets are subdivided into slices. The D2D interface includes a transmission interface coupled between first and second chiplets, which includes a first transmission path for a first slice and a second transmission path for a second slice. The first chiplet includes receive circuitry which further includes a write interface and a read interface. The write interface stores data received from the first transmission path into a first first-in, first out (FIFO) using a first clock signal received via the first transmission path, and stores data received from the second transmission path into a second FIFO using a second clock signal received via the second transmission path. The read interface reads data stored in the first and second FIFOs using the first clock signal. The first and second transmission paths may be subject to different delays.

The receive circuitry may include a first write counter that provides a first write pointer to the first FIFO, in which the first write counter has a clock input receiving the first clock signal, a first read counter that provides a first read pointer to the first FIFO, in which the first read counter has a clock input receiving the first receive clock, a second write counter that provides a second write pointer to the second FIFO, in which the second write counter has a clock input receiving the second clock signal, and a second read counter that provides a second read pointer to the second FIFO, in which the second read counter has a clock input receiving the first clock signal.

The D2D interface may include a skew controller that is configured to read a first sample of first data from the first FIFO using the first read pointer, to read a second sample of the duplicate first data from the second FIFO using the second read pointer, and to compare the first and second samples to determine skew adjustment. The D2D interface may further include nudge logic that is configured to delay the second read pointer when the comparison indicates that second FIFO is ahead of the first FIFO. The nudge logic may be configured to delay the first read pointer when the comparison indicates that the first FIFO is ahead of the second FIFO. The first data and the duplicate first data may each include incremental training data values indicative of clock cycle transitions. The nudge logic may be configured to delay one of the first and second read pointers by a number of clock cycles based on a difference between the first and second samples.

DETAILED DESCRIPTION

The present disclosure describes how two chiplets of an SoC communicate with each other using a standard layered protocol that governs how messages on different internal buses are combined into a single data stream that is transmitted over multiple, independent multibit data slices. Each slice has a separate clock associated with the data, and the propagation of the clock and data on one slice may be skewed relative to the clock and data on other slices based on variations in process, temperature, voltage, signal routing, etc. A first-in, first-out (FIFO) deskew buffer is provided which functions to realign the data transmitted on different slices so that the receive interface can process the data (i.e., the data across slices). Conceptually, the deskew FIFO synchronizes the data from different slices to a common clock and delays the different data slices as necessary to align them properly.

There are several embodiments with varying levels of logical and implementation complexity. In particular, one embodiment would treat the synchronization function separate from the delay function. Additionally, the selection of the common clock has implications on the synchronization function, depending on how the common clock is related to the clocks forwarded with each data slice. One embodiment is to combine the synchronization function and delay function into a single FIFO and to use one of the forwarded clocks as a common clock. This choice eliminates separate shift registers, while the latter choice minimizes the depth of the FIFO. Consequently, the combined FIFO is smaller and lower power than a separate implementation, and the synchronization function requires fewer FIFO entries because the accumulated skew and jitter between the common read clock (which is a forwarded clock rather than a clock generated on the receive chiplet) and the various forwarded write clocks is small, because much of the variation is common mode. Different delays on each data slice are achieved by adjusting read pointers in the FIFO relative to the write pointers. By using a forwarded clock as a common clock (or read clock), skew related to clock variations across chiplets is eliminated.

Figure 1:
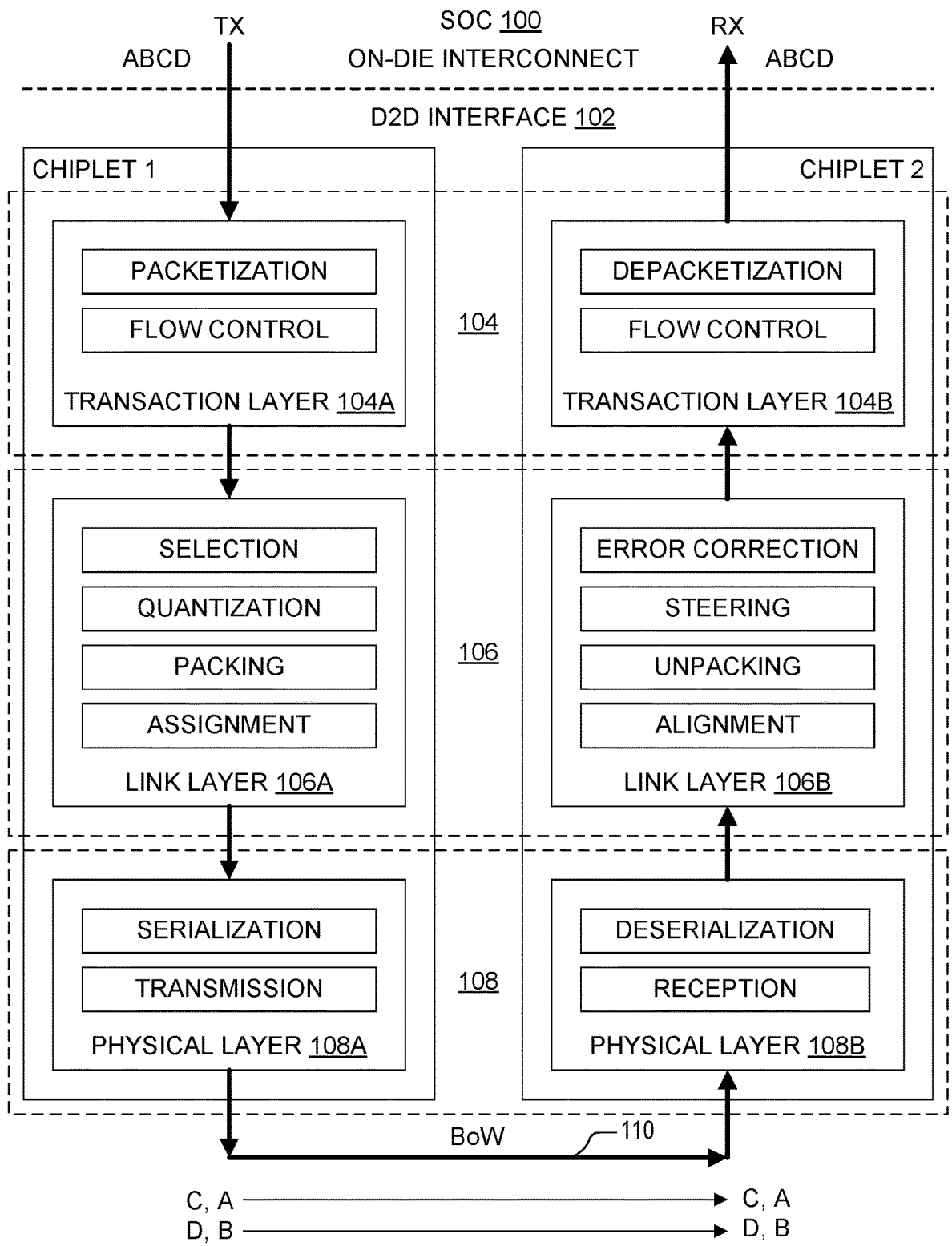
FIG. 1 is a simplified block diagram of a System on Chip (SoC) on-die interconnect configured with a die-to-die (D2D) interface implemented according to one embodiment that enables communication between first and second chiplets.

FIG. 1 is a simplified block diagram of an SoC 100 on-die interconnect configured with a die-to-die (D2D) interface 102 implemented according to one embodiment that enables communication between a first chiplet 1 and a second chiplet 2. The D2D interface 102 is based on a layered architecture in which each chiplet includes a transaction layer 104, a link layer 106, and a physical layer 108. The physical layer 108 of the chiplets 1 and 2 are interfaced via a transmission interface in the form of a band-of-wire (BoW) interface 110 as described further herein. Although only 2 chiplets are shown, it is understood that any number of chiplets may be included, although a separate D2D interface may be provided between each chiplet pair. Although not specifically shown in FIG. 1, each of the chiplets includes multiple slices in which each slice has a corresponding bit size. In one embodiment, each of the slices are 16-bit slices, although any suitable size is contemplated in different embodiments.

The transmit (TX) interface of chiplet 1 and the receive (RX) interface of chiplet 2 is shown for transmitting information from chiplet 1 to chiplet 2. For the TX interface, the transaction layer 104 of chiplet 1 is configured as a transaction layer 104A for performing packetization and flow control functions, the link layer 106 of chiplet 1 is configured as a link layer 106A for selection, quantization, packing, and assignment functions, and the physical layer 108 of chiplet 1 is configured as a physical layer 108A for performing serialization and transmission functions. For the RX interface, the transaction layer 104 of chiplet 2 is configured as a transaction layer 104B for performing depacketization and flow control functions, the link layer 106 of chiplet 2 is configured as a link layer 106B for error correction, steering, unpacking, and alignment functions, and the physical layer 108 of chiplet 2 is configured as a physical layer 108B for performing deserialization and reception functions.

In one embodiment, the transaction layer 104 interfaces with the SoC on-die interconnect, translates protocol packets, e.g., CHI (Coherent Hub Interface) packets, and protocol transfers, e.g., AXIS-Lite (Advanced eXtensible Interface) transfers, into transaction layer packets (TLPs) and vice versa, and manages flow control for individual channels, or flows, within all the supported protocols. In the transmit (TX) interface, the link layer 106 is responsible for selecting TLPs to transmit. Error correcting code may be added to the TLPs, which are divided into granules that are packed into link layer packets (LLPs). The LLPs may then be assigned to the available slices of the BoW interface 110. In the receive (RX) interface, the link layer 106 aligns the LLPs received by the slices, unpacks the LLPs into TLPs, steers the TLPs to processing pipelines, and corrects any errors detected. The corrected TLPs are presented to the appropriate protocol channel in the transaction layer.

In one embodiment, the physical layer of the slices of the BoW interface 110 perform serialization/deserialization and clock alignment between the link layer clock and transmit and receive data clocks. The TX interface may transmit X bits (Xb) of data at double data rate, i.e., Y bits (Yb) on the rising edge and Yb on the falling edge, using a source-synchronous clock, and the RX interface samples the data based on the received clock (in which X=2Y). In one embodiment, Y=16b and X=32b. although different bit sizes are contemplated for different implementations. The entire D2D interface 102 may be rate matched. As a result, flow control is only implemented in the transaction layer 104 to prevent buffer overruns (and to avoid protocol deadlock due to head-of-line blocking), and no asynchronous clock domain crossings are required within the TX interface and the RX interface. If necessary, an asynchronous clock domain crossing between the on-die interconnect and the D2D interface may be implemented at the transaction layer.

As a simplified example, data ABCD may be transmitted from chiplet 1 to chiplet 2 in which each chiplet includes Y-bit slices. The data ABCD is separated into Y-bit values A, B, C, and D, in which A and B are transmitted first on the two slices, followed by C and D. The data is reassembled as ABCD by chiplet 2. The challenge of the alignment function of the link layer 106B is to adjust for skew and align the received data to ensure data coherency of chiplet 2.

Figure 2:
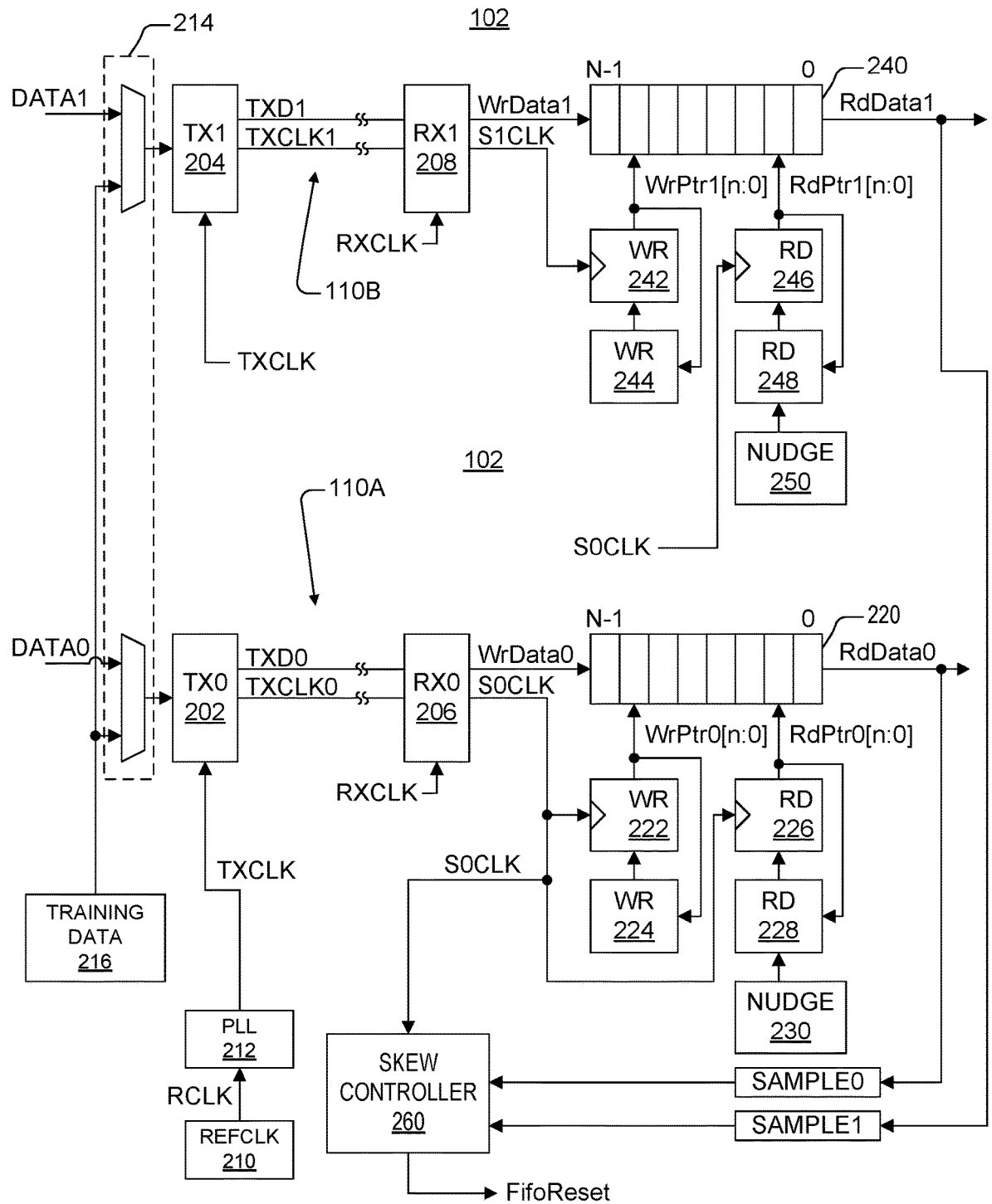
FIG. 2 is a simplified block diagram of applicable portions of the D2D interface of FIG. 1 for two slices configured to communicate via the band-of-wire (BoW) interface of FIG. 1 according to one embodiment.

FIG. 2 is a simplified block diagram of applicable portions of the D2D interface 102 for two slices 0 and 1 configured to communicate via the BoW interface 110 according to one embodiment. The BoW interface 110 is shown subdivided into a first transmission path 110A for slice 0 and a second transmission path 110B for slice 1, in which the separate transmission paths 110A and 110B may comprise different or diverse transmission paths on the SoC 100 and be subject to different static and dynamic delays. The physical layer 108A of chiplet 1 is represented by a transmit circuit for slice 0 (TX0) 202 and a transmit circuit for slice 1 (TX1) 204, and the physical layer 108B of chiplet 2 is represented by a receive circuit for slice 0 (RX0) 206 and a receive circuit for slice 1 (RX1) 208. An off-chip oscillator circuit 210 provides a reference clock RCLK to an on-chip phase-locked loop (PLL) circuit 212 for generating a transmit clock TXCLK, which is provided to TX0 202 and TX1 204. A receive clock RXCLK is provided to RX0 206 and RX1 208 and may be developed in a similar manner as TXCLK and is not further described. The link layer 106A of chiplet 1 includes multiplex (MUX) circuitry 214 which selects between normal data and training data from a training data generator 216 for transmission on a per slice basis. The normal data includes DATA0 for slice 0 and DATA1 for slice 1, whereas the training data is duplicative so that the same training data is transmitted for each slice.

The link layer 106B of chiplet 2 includes a FIFO 220, a write counter 222, write logic 224, a read counter 226, read logic 228, and nudge logic 230 for slice 0, and includes a FIFO 240, a write counter 242, write logic 244, a read counter 246, read logic 248, and nudge logic 240 for slice 1. For slice 0, the write counter 222 generates a write pointer WrPtr0[n:0] for the FIFO 220, which is fed back to the write logic 224 and which may be used to control and load data into the write counter 222. Also, the read counter 226 generates a read pointer RdPtr0[n:0] for the FIFO 220, which is fed back to the read logic 228 and which may be used to control and load data into the read counter 226. The nudge logic 230 has an output provided to an input of the read logic 228 for nudging RdPtr0[n:0] forward or backward by one or more clock cycles. For slice 1, the write counter 242 generates a write pointer WrPtr1[n:0] for the FIFO 240, which is fed back to the write logic 244 and which may be used to control and load data into the write counter 242. Also, the read counter 246 generates a read pointer RdPtr1[n:0] for the FIFO 240, which is fed back to the read logic 248 and which may be used to control and load data into the read counter 246. The nudge logic 250 has an output provided to an input of the read logic 248 for nudging RdPtr1[n:0] forward or backward by one or more clock cycles.

The pointer size value "n" indicates the number of bits of the FIFO pointers which in turn is determined by the size N of the FIFOs 220 and 240 (in which $2^{n+1}=N$). In one embodiment, the FIFOs 220 and 240 each have N=8 entries in which n=2 for a 3-bit pointer. Alternative sizes are contemplated for different configurations. The write logic 224 and 244 are provided to initialize and control the corresponding write pointers WrPtr0[n:0] and WrPtr1[n:0], respectively. In one embodiment, for example, the pointers WrPtr0[n:0] and WrPtr1[n:0] are each initialized with binary 0 values and held in reset by the write logic 224 and 244, respectively, until released by a FIFO reset (FifoReset) signal asserted by a skew controller 260 as further described herein. Also, each write logic 224 and 244 includes a two-stage synchronizer to eliminate metastability issues and that provides corresponding write pointer valid signals when the corresponding write pointer is valid. In addition, each write logic 224 and 244 controls wrap around functions of the write pointers of the FIFOs 220 and 240. The read logic 228 and 248 are provided to initialize and control the corresponding read pointers RdPtr0[n:0] and RdPtr1[n:0], respectively. In one embodiment, for example, the pointers RdPtr0[n:0] and RdPtr1[n:0] are each initialized with binary end values (last entry in the corresponding FIFO) and held in reset by the read logic 228 and 248, respectively, until released by a corresponding write pointer valid signal. Also, each read logic 228 and 248 includes a two-stage synchronizer to eliminate metastability issues and that provides corresponding read pointer valid signals when the corresponding read pointer is valid. In addition, each read logic 228 and 248 controls wrap around functions of the read pointers of the FIFOs 220 and 240.

TX0 202 transmits data on lines TXD0 along with a clock signal TXCLK0 on the first transmission path 110A for slice 0, and TX1 204 transmits data on lines TXD1 along with a clock signal TXCLK1 on the second transmission path 110B for slice 1. TXCLK0 and TXCLK1 are both derived directly from TXCLK from the PLL 212 and thus are closely, if not perfectly, aligned. TXD0 is received by RX0 206 and provided as WrData0 data for slice 0, which is provided to a data input of the FIFO 220 and written to a location pointed to by WrPtr0[n:0]. TXCLK0 is received by RX0 206 and provided as S0CLK for slice 0, which is provided to clock inputs of the write counter 222 of slice 0, the read counter 226 of slice 0, and to the clock input of the read counter 246 of slice 1. The FIFO 220 has an output providing RdData0 pointed to by RdPtr0[n:0]. TXD1 is received by RX1 208 and provided as WrData1 for slice 1, which is provided to a data input of the FIFO 240 and written to a location pointed to by WrPtr1[n:0]. TXCLK1 is received by RX1 208 and provided as S1CLK for slice 1, which is provided to a clock input of the write counter 242 for slice 1. It is noted that S0CLK is provided to the clock input of the read counter 246 of slice 1 rather than S1CLK. The FIFO 240 has an output providing RdData1 pointed to by RdPtr1[n:0].

TXCLK0 travels in close proximity with TXD0 via the first transmission path 110A so that S0CLK is synchronous with WrData0, in which S0CLK may be used as the clock signal for writing WrData0 into the FIFO 220. In a similar manner, TXCLK1 travels in close proximity with TXD1 via the second transmission path 110B so that S1CLK is synchronous with WrData1, in which S1CLK may be used as the clock signal for writing WrData1 into the FIFO 240. It is noted, however, that the BoW interface 110 is diverse so that the TXD0/TXCLK0 signal lines and the TXD1/TXCLK1 signal lines are along separate transmission paths 110A and 110B, respectively, in which the separate transmission paths of the transmission interface may be subject to different static and dynamic delays. In this manner, S1CLK (and corresponding data WrData1) is skewed relative to S0CLK (and corresponding data WrData0). In one embodiment, the relative skew may be designed to be limited to within 1 clock period. In other embodiments, the relative skew may be greater than 1 clock period and even possibly greater than 2 clock periods. In addition, the relative skew between S0CLK and S1CLK may vary over time. In this manner, the FIFOs 220 and 240 are written asynchronously with respect to each other. Such asynchronous configuration might otherwise be problematic when attempting to align data between FIFO 220 and FIFO 240, and each of the FIFOs might otherwise be configured to be relatively "deep" each including a significantly greater number of entries to enable data coherency therebetween.

As shown, S0CLK is provided as the read clock for reading from FIFO 220, so that read and write cycles are synchronous with respect to each other. Although the same configuration could be used for the FIFO 240 for slice 1 in which S1CLK could be used for reading from FIFO 240, instead S0CLK is used for reading from FIFO 240 of slice 1. In this manner, skew variation of data reads of the FIFOs 220 and 240 are minimized allowing the FIFOs 220 and 240 to be reduced in size with less entries. Nonetheless, skew remains and varies somewhat over time.

The skew controller 260 is provided to detect relative skew between the FIFOs 220 and 240 and to adjust timing so that read data is aligned. The skew controller 260 receives S0CLK and provides the FifoReset signal. The skew controller 260 controls or otherwise prompts the MUX circuitry 214 to select the training data generator 216, which outputs the same training data to be transmitted via TX0 202 and TX1 204 and stored into the FIFOs 220 and 240. As the training data is received and written into the FIFOs 220 and 240, the skew controller 260 reads a SAMPLE0 written into the FIFO 220 for slice 0 and reads a SAMPLE1 written into the FIFO 240 for slice 1 at the same time based on an operative edge of S0CLK. In one embodiment, the training data is sent in linear numerical increments, so that a comparator within the skew controller 260 can compare SAMPLE0 and SAMPLE1 and determine relative skew in clock cycles based on the difference between SAMPLE0 and SAMPLE1. As described further herein, when SAMPLE0=SAMPLE1, the data is aligned and no further adjustment is necessary. When SAMPLE1>SAMPLE0, then the nudge logic 250 is controlled to delay RdPtr1[n:0] by a number of clock cycles based on the difference between SAMPLE1 and SAMPLE0. When SAMPLE1<SAMPLE0, then the nudge logic 230 is controlled to delay RdPtr0[n:0] by a number of clock cycles based on the difference between SAMPLE0 and SAMPLE1.

In one embodiment, transmission of data from chiplet 1 to chiplet 2 is continuous once started even when there is nothing substantive to transfer. When there is nothing substantive to transfer, chiplet 1 simply transfers null or dummy data that is ignored by chiplet 2 in order to maintain a continuous transmission stream. Once skew alignment is performed during the initial transmission of training data, no further skew alignment is necessary.

As previously described, skew between any two slices, including slices 0 and 1 of chiplets 1 and 2, occurs because of differences in the delays between the two transmission paths 110A and 110B of the BoW interface 110. A fixed, static difference arises due to variations in design, layout, routing, manufacturing, etc., while a time-varying, dynamic difference arises due to changes in operating conditions, such as, for example, voltage and temperature changes among other possible variations. Including both skew timing differences, the total skew between the two paths should be less than a specified limit C. In one embodiment, the difference C is limited to the clock period of TXCLK, which is the same as the clock period of TXCLK0, TXCLK1, S0CLK and S1CLK. In one more specific embodiment, the clock period, and thus C, is 500 picoseconds (ps), although any suitable clock period may be used. In one embodiment, skew may be expressed relative to the slice 0 delay, such that a positive skew results when the slice 1 delay is greater than the slice 0 delay, while a negative skew results when the slice 1 delay is less than the slice 0 delay.

It is noted that the "less than" constraint is chosen (instead of "less than or equal to") to ensure that there can be at most two possibilities of delays for any given phase alignment of the two slice clocks. For example, assume the slice 1 clock edge is x ps later than the slice 0 clock edge, where 0≤x<C. When x≠0, the skew is either x ps, if the slice 1 delay is greater than the slice 0 delay, or (x−C) ps, if the slice 1 delay is less than the slice 0 delay. When x=0, the slice 0 and 1 delays should be the same, and the skew should be 0; however, without this restriction, the skew could be −C, 0, or C.

There are three conceptual clocks in the receive interface, S0CLK, S1CLK, and RXCLK. In one embodiment, RXCLK is synchronous to S0CLK, so that S0CLK is used in lieu of RXCLK for synchronizing the deskew FIFOs 220 and 240. As a result, S0CLK is used as the read clock for the slice 1 FIFO 240 as shown. Because the slice 0 FIFO read and write clocks are synchronous, meaning that the phase between the two clocks is 0, the relationship between the write pointer and read pointer is fixed once the FifoReset signal is de-asserted by the skew controller 260. However, the de-assertion of the FifoReset signal captures a snapshot of the phase difference between the S1CLK and S0CLK. As described above, this relationship represents one of up to two possible skew values. As the skew between S1CLK and S0CLK changes over time, the relationship of the write pointer relative to the read pointer also changes.

The FifoReset signal is synchronized using a two-stage synchronizer or the like from the receive domain (RX0 206 and RX1 208) into the write domain to generate a write valid signal, which is then synchronized also using a two-stage synchronizer or the like from the write domain into the read domain to generate a read pointer valid signal. For the slice 0 FIFO 220, each synchronization results in a two-cycle delay. However, for the slice 1 FIFO 240, different scenarios arise depending on the current phase and skew relationships between S1CLK and S0CLK. Notably, although unlikely, if the phase between the two clocks is close to 0, a transition on the input signal to a synchronizer may be captured by, or "race" into, the synchronizer similar to a hold violation. It is assumed that the latency from a captured transition on the input of the first synchronizer flip-flop (not shown) to a corresponding transition on the output of the second synchronizer flip-flop (not shown) is larger than a clock cycle, so back-to-back races should not occur.

Figure 3:
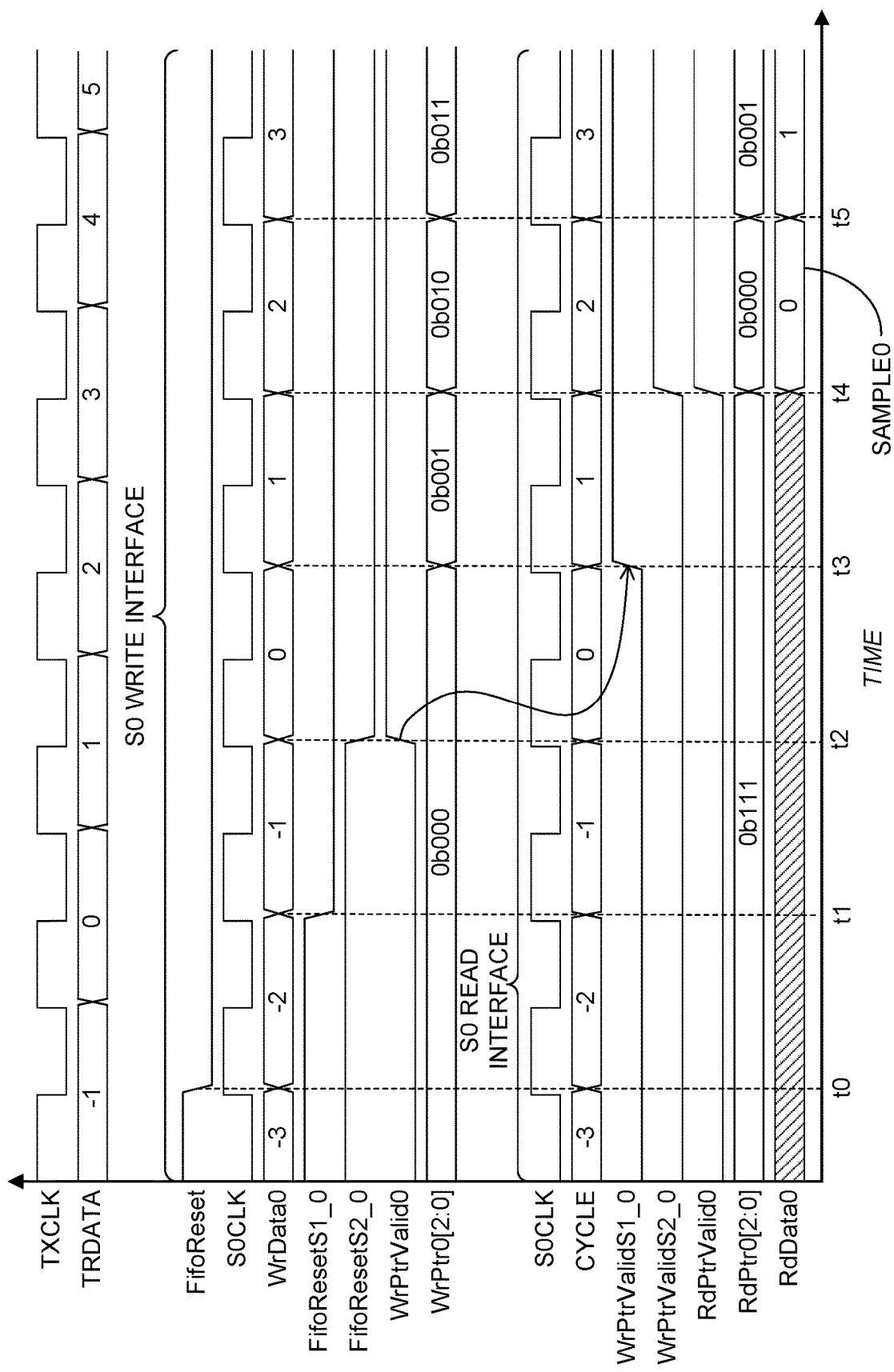
FIG. 3 is a timing diagram illustrating transmission and reception of training data for a first slice 0, including a slice 0 (S0) write interface transaction for writing data into the FIFO of FIG. 2 and an S0 read interface transaction for reading the data by the skew controller of FIG. 2 according to one embodiment.
Figure 4:
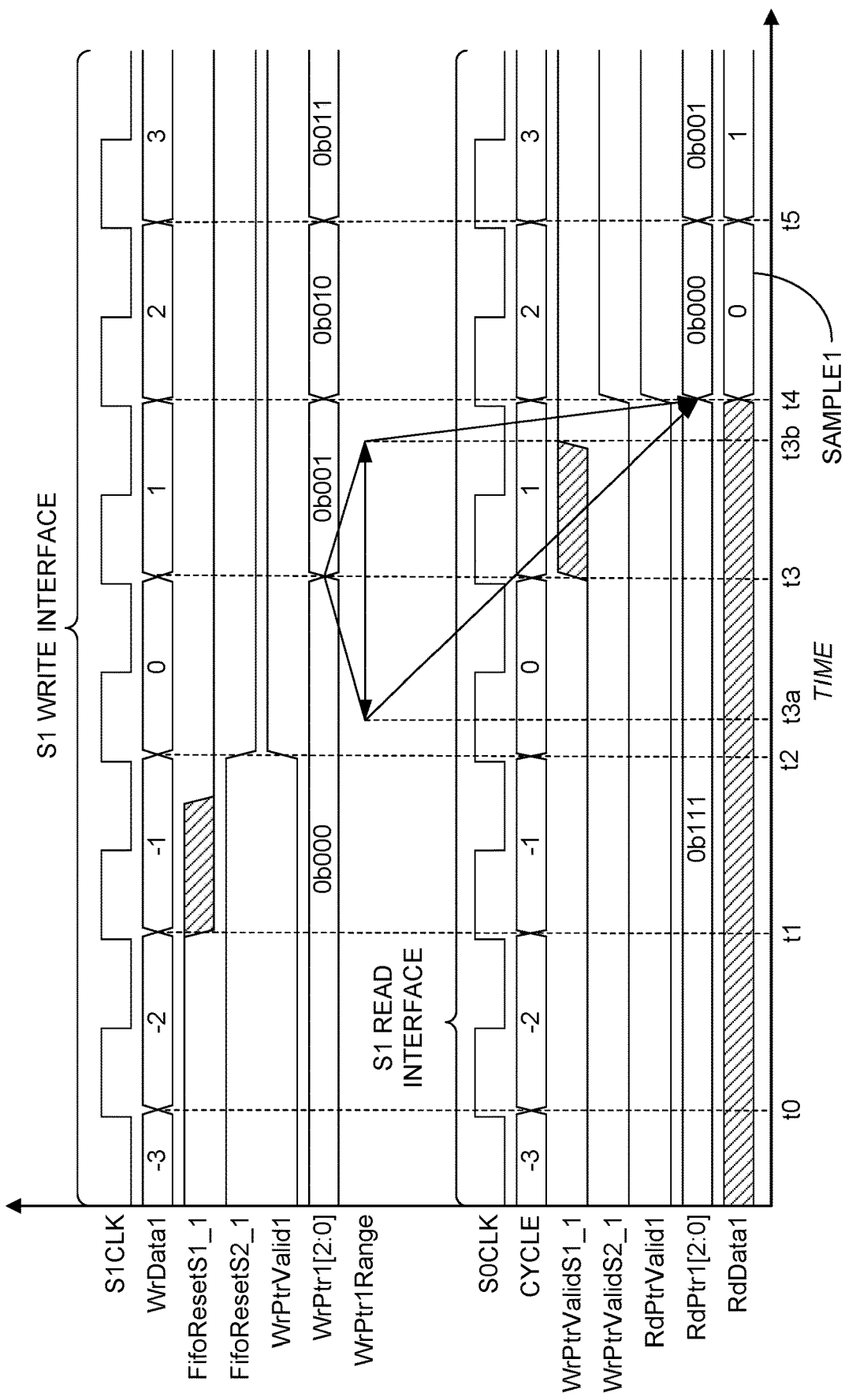
FIG. 4 is a timing diagram illustrating reception of training data for a second slice 1 when the slice 1 and 2 clock signals S0CLK and S1CLK are aligned and in which no synchronizer race occurs according to one embodiment.
Figure 5:
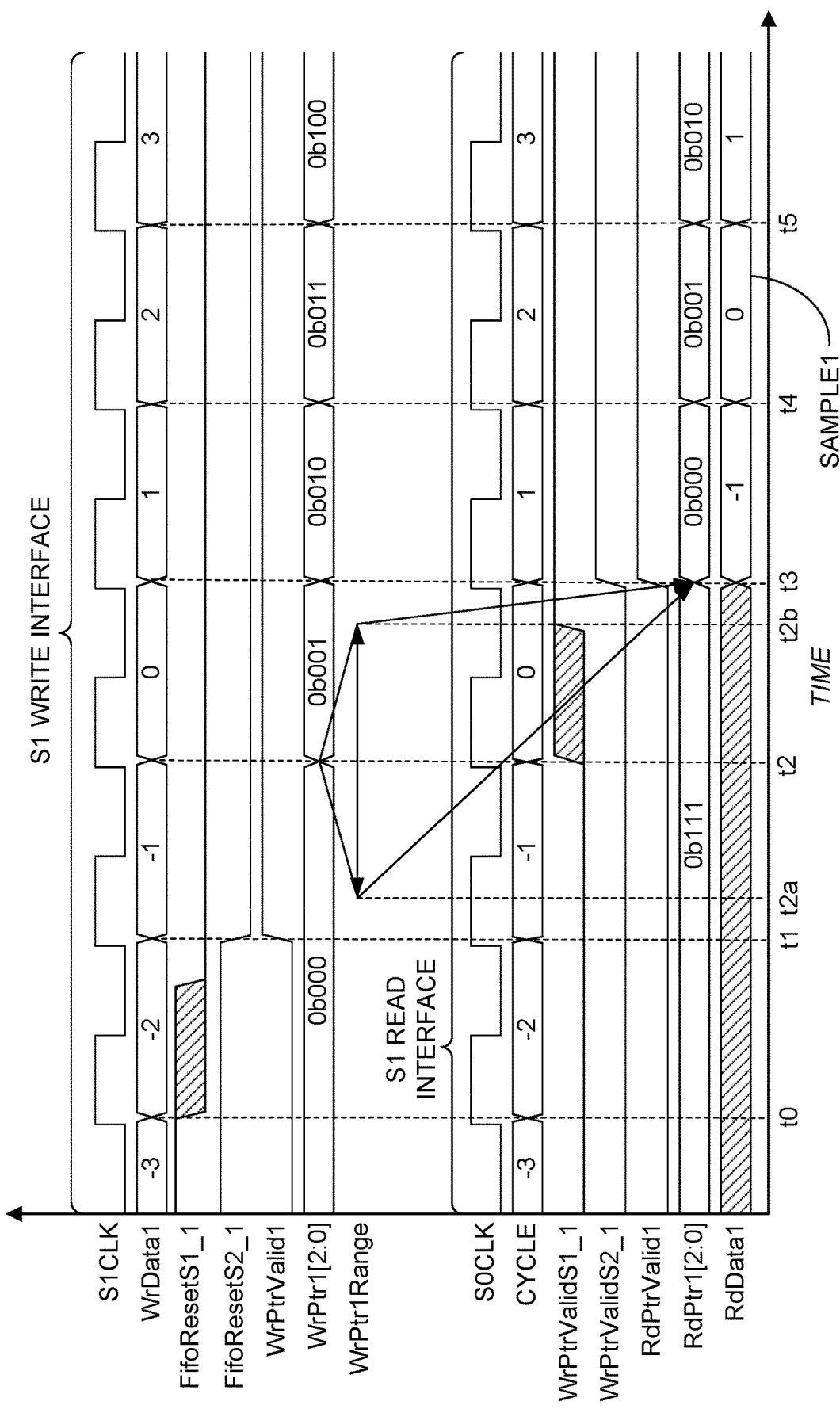
FIG. 5 is a timing diagram illustrating reception of training data for slice 1 when the S0CLK and S1CLK signals are aligned and in which a first synchronizer race from FIFO reset to the write pointer valid signal occurs according to one embodiment.
Figure 6:
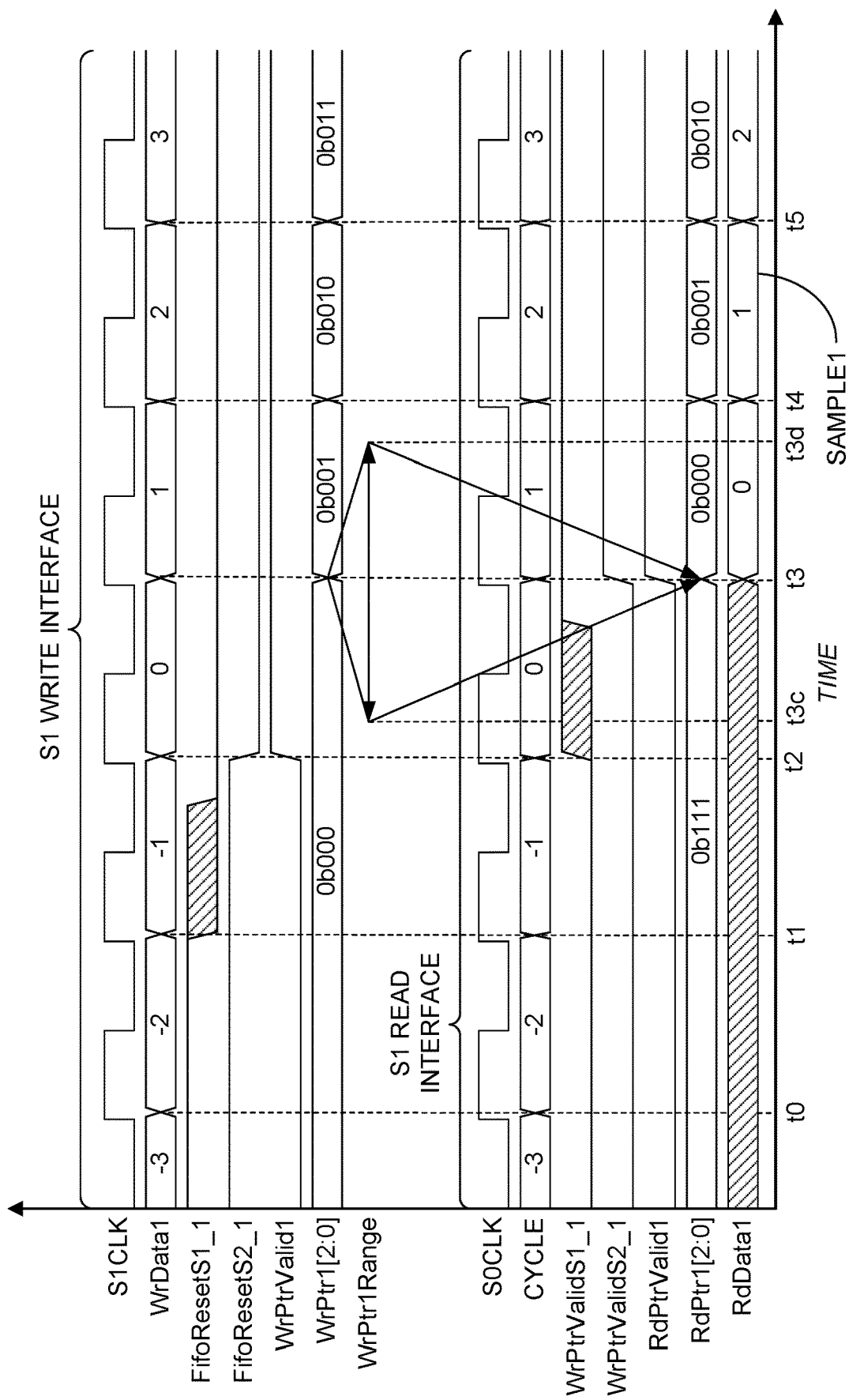
FIG. 6 is a timing diagram illustrating reception of training data for slice 1 when the S0CLK and S1CLK signals are aligned in which a second synchronizer race from the write pointer valid signal to the read pointer valid signal occurs according to one embodiment.
Figure 7:
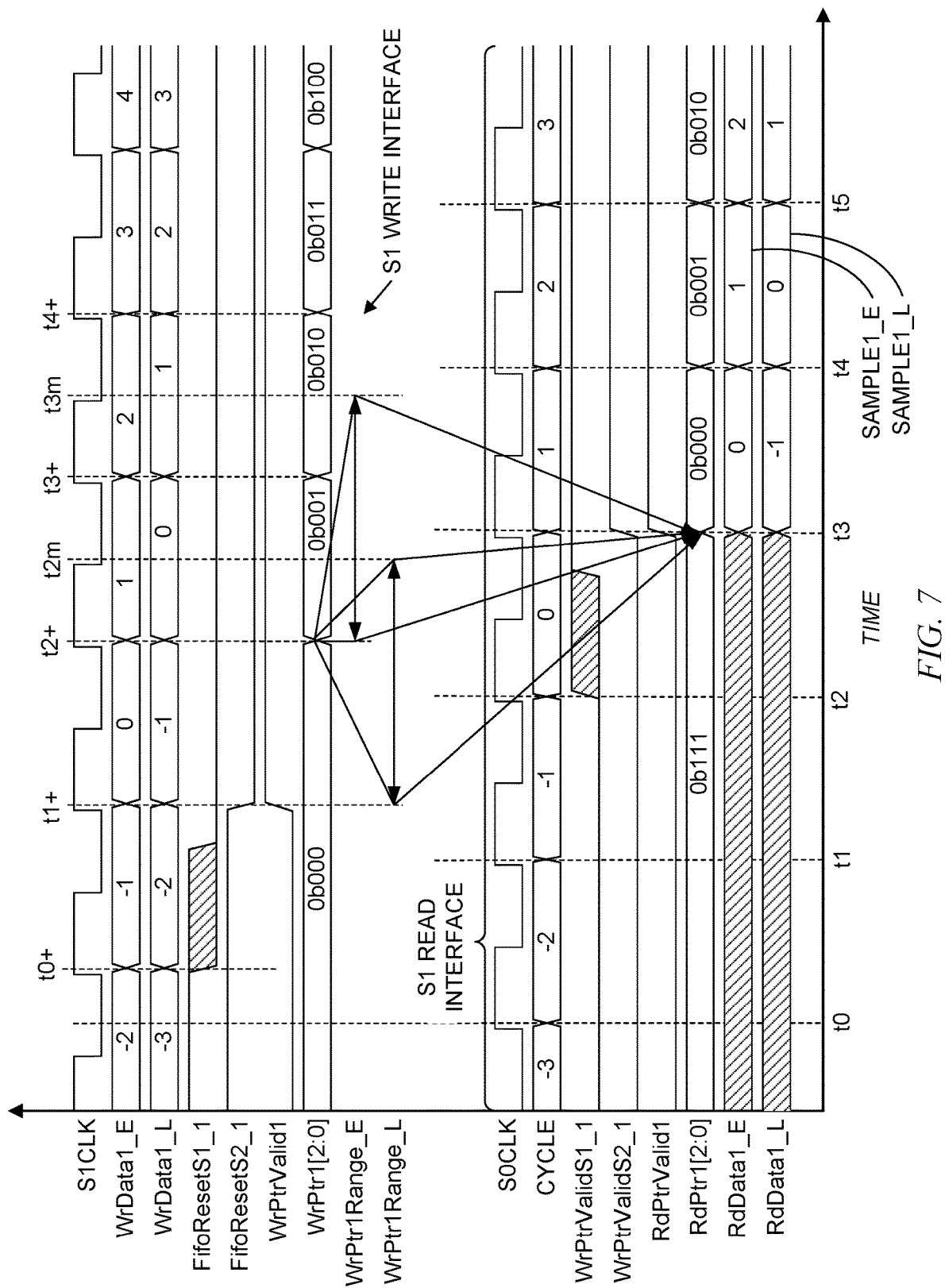
FIG. 7 is a timing diagram illustrating reception of training data for slice 1 when the S0CLK and S1CLK signals are not aligned such that the phase and skew (or the slice 0 and slice 1 delays) are not equal, illustrating negative skew in which the first synchronization is shorter than the second according to one embodiment.
Figure 8:
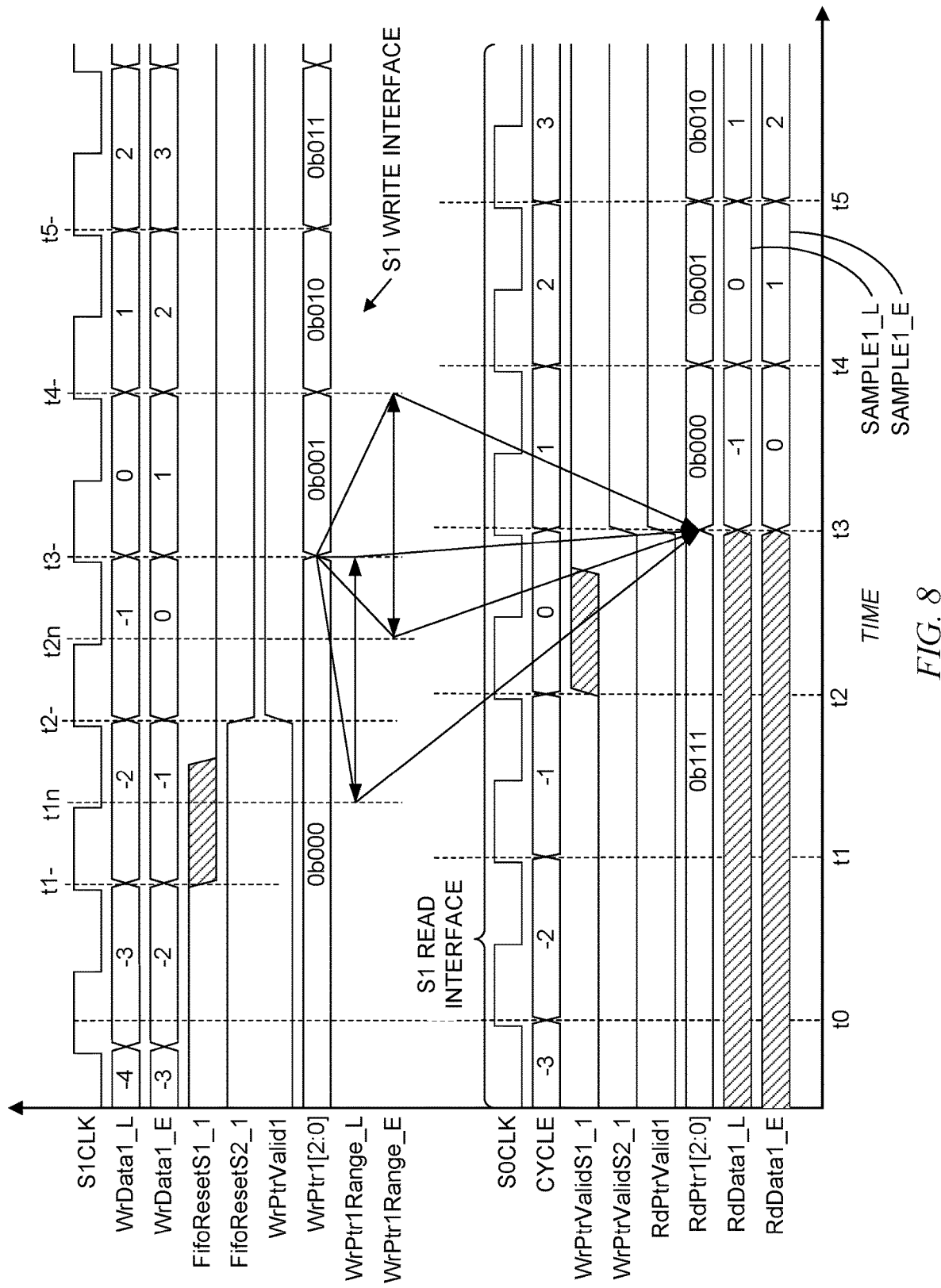
FIG. 8 is a timing diagram illustrating reception of training data for slice 1 when the S0CLK and S1CLK signals are not aligned such that the phase and skew (or the slice 0 and slice 1 delays) are not equal, illustrating positive skew in which the first synchronization is longer than the second according to one embodiment.

The following Figures show timing diagrams that describe various synchronization scenarios based on skew and phase relationships. These timing diagrams illustrate the phase and skew relationships at the de-assertion of the FifoReset signal, the range of skew possible after the de-assertion of the FifoReset signal, and the resulting write and read pointer relationships. FIG. 3 illustrates write and read interface timing of slice 0 based on S0CLK and is used to illustrate baseline timing for the write and read interface timing of slice 1. FIGS. 4, 5, and 6 illustrate scenarios in which S0CLK and S1CLK are substantially aligned such that the phase and skew (or the slice 0 and slice 1 delays) are approximately equal to zero. Three different synchronizations are possible when S0CLK and S1CLK are substantially aligned, including no synchronizer race (FIG. 4), a first synchronizer race from FifoReset to the write pointer valid signal for the slice 1 synchronizer (FIG. 5), and a second synchronizer race from a write pointer valid signal to the subsequent read pointer valid synchronizer for slice 1 (FIG. 6). FIGS. 7 and 8 illustrate scenarios when S0CLK and S1CLK are unaligned such that the phase and skew (or the slice 0 and slice 1 delays) are not equal.

FIG. 3 is a timing diagram illustrating transmission and reception of training data for slice 0, including a slice 0 (S0) write interface transaction for writing data into the FIFO 220 and an S0 read interface transaction for reading the data by the skew controller 260 according to one embodiment. A clock signal TXCLK and corresponding data TRDATA are plotted at the top illustrating transmission of the training data from TX0 202 for slice 0, in which TRDATA data is provided on TXD0 and in which TXCLK represents either TXCLK0 or TXCLK1 (given that both are substantially aligned at the transmitter of chiplet 1). TRDATA is shown with numeric values relative to a value "0" which is incremented by 1 each consecutive subsequent clock cycle upon the rising edge of TXCLK, i.e., "1", "2", "3", . . . . Values of TXD0 prior to value 0 are decremented by 1 each consecutive previous clock cycle, i.e., "−1", "−2", "−3", . . . , to illustrate relative clock cycle timing. The numeric values representing the training data may simply be numeric markers and not actually training data values. Nonetheless, the sequential training data values may be numerically separated by incremental amounts so that a difference between two training values determines a corresponding number of clock cycles.

The skew controller 260 initially asserts FifoReset high to keep both of the FIFOs 220 and 240 in a reset state until ready to receive data. Although not specifically shown, the skew controller 260 prompts the training data generator 216 to output training data and controls the MUX circuitry 214 to select the training data to be transmitted via TX0 202 for slice 0 and TX1 204 for slice 1. At an initial time t0, the skew controller 260 de-asserts FifoReset low synchronous with a rising edge of S0CLK to enable the transmitted training data to be written into the FIFOs 220 and 240. S0CLK is the received version of TXCLK0 (and thus TXCLK) as previously described.

The plotted signals for the S0 write interface include S0CLK, WrData0 (received version of TXD0 carrying the training data), first and second stage reset signals FifoResetS1_0 and FifoResetS2_0 of the two-stage synchronizer for slice 0 located within the write logic 224 to eliminate metastability issues, a write pointer valid signal WrPtrValid0 generated by the synchronizer of the write logic 224 to indicate validity of the write pointer WrPtr0[n:0], and a 3-bit version of the write pointer shown as WrPtr0[2:0]. WrPtrValid0 is initially de-asserted low by the synchronizer and WrPtr0[2:0] is held at a binary 0 value of 0b000 (in which "0b" denotes a binary value) while WrPtrValid0 is low.

In response to FifoReset being de-asserted low, the synchronizer of the write logic 224 de-asserts FifoResetS1_0 low at the next rising edge of S0CLK at a time t1 and de-asserts FifoResetS2_0 low at the next rising edge of S0CLK at a time t2. At time t2 in response to de-assertion of FifoResetS2_0, the WrPtrValid0 is asserted high to release the WrPtr0[2:0] to begin incrementing upon each subsequent rising edge of S0CLK in sequential cycles. Upon the next rising edge of S0CLK at time t3, the WrData0 data value of 0 is written into location 0b000 pointed to by WrPtr0[2:0]. Upon next rising edge of S0CLK at time t4, the WrData0 data value incremented to 1 is written into location 0b001 pointed to by incremented pointer WrPtr0[2:0]. Operation may repeat in this manner for subsequent S0CLK cycles. Although not shown, eventually the data being transmitted is transitioned from training data to actual data.

The next set of signals are plotted for the S0 read interface to illustrate reading data from the FIFO 220. S0CLK and CYCLE data are plotted as timing references, in which CYCLE is a duplicate of WrData0. The additional plotted signals include first and second stage write pointer valid signals WrPtrValidS1_0 and WrPtrValidS2_0 of the two-stage synchronizer located within the read logic 228 for slice 0 to eliminate metastability issues, a read pointer valid signal RdPtrValid0 generated by the synchronizer of the read logic 228 to indicate validity of the read pointer RdPtr0[n:0], a 3-bit version of the read pointer shown as RdPtr0[2:0], and RdData0 data indicating the data read from the FIFO 220 by the skew controller 260. RdPtrValid0 is initially de-asserted low and RdPtr0[2:0] is held at a binary value of 0b111 while RdPtrValid0 is low. RdData0 is initially shown shaded indicating unknown or "don't care" data.

In response to WrPtrValid0 being asserted high at time t2, the synchronizer within the read logic 228 asserts WrPtrValidS1_0 high at the next rising edge of S0CLK at time t3 and asserts WrPtrValidS2_0 high at the subsequent rising edge of S0CLK at a time t4. At time t4 in response to assertion of WrPtrValidS2_0, the RdPtrValid0 is asserted high to release the RdPtr0[2:0] to increment immediately and upon each subsequent rising edge of S0CLK in sequential cycles. At time t4, RdPtr0[2:0] wraps to point to location 0b000 of the FIFO 220. Upon the next rising edge of S0CLK at time t5, the RdData0 data value of 0 in FIFO 220 pointed to by read pointer RdPtr[2:0] is read by the skew controller 260 from location 0b000. Operation may repeat in this manner for subsequent S0CLK cycles. In this case for the training data, the RdData0 data value of 0 is read by the skew controller 260 as the SAMPLE0 value at time t5. In particular, the RdData0 data value of 0 set up between times t4 to t5 is latched at time t5 as the read data.

The timing diagrams shown in the following FIGS. 4-8 depict timing for a slice 1 (S1) write interface transaction for writing data into the FIFO 240 and a corresponding S1 read interface transaction for reading the data from the FIFO 240 by the skew controller 260 for different timing scenarios. The S0 write and read interface transactions for slice 0 shown in FIG. 3 provide a baseline timing reference for the slice 1 transactions. FIGS. 4-6 depict operation for when S0CLK and S1CLK are substantially aligned, and FIGS. 7 and 8 illustrate scenarios for when S0CLK and S1CLK are unaligned.

FIG. 4 is a timing diagram illustrating reception of training data for slice 1 when the S0CLK and S1CLK signals are aligned and in which no synchronizer race occurs according to one embodiment. The transaction process shown in FIG. 4 is one possible example of skew timing that may occur in slice 1 operating in parallel with slice 0 for the same training data when S0CLK and S1CLK are substantially aligned. The training data that is transmitted on slice 0 is simultaneously transmitted on TXD1 from TX1 204 for slice 1 along with clock TXCLK1, which are received by RX1 208 and provided as WrData1 data and S1CLK, respectively. As previously described for FIG. 3, the skew controller 260 de-asserts FifoReset low at initial time t0 synchronous with a rising edge of S0CLK to enable the transmitted training data to be written into the FIFOs 220 and 240.

The plotted signals or values for the S1 write interface as shown in FIG. 4 include the S1CLK clock signal and the WrData1 data, in which S1CLK goes high at about time t0 (in alignment with S0CLK) and the WrData1 data is plotted as substantially aligned with WrData0. The plotted signals for the S1 write interface also include first and second stage reset signals FifoResetS1_1 and FifoResetS2_2 of the two-stage synchronizer located within the write logic 244 for slice 1 to eliminate metastability issues, a write pointer valid signal WrPtrValid1 generated by the synchronizer of the write logic 244 to indicate validity of the write pointer WrPtr1[n:0], and a 3-bit version of the write pointer for slice 1 shown as WrPtr1[2:0]. WrPtrValid1 is initially de-asserted low by the synchronizer and WrPtr1[2:0] is held at the binary value of 0b000 while WrPtrValid1 is low.

In response to FifoReset being de-asserted low at time t0, the synchronizer of the write logic 244 de-asserts FifoResetS1_1 low at the next rising edge of S1CLK at time t1 and de-asserts FifoResetS2_1 low at the next rising edge of S1CLK at time t2. At time t2 in response to de-assertion of FifoResetS2_1, the WrPtrValid1 signal is asserted high to release the WrPtr1[2:0] to begin incrementing upon each subsequent rising edge of S1CLK in sequential cycles. At the next rising edge of S1CLK at time t3, the WrData1 data value of 0 is written into location 0b000 pointed to by WrPtr1[2:0], and upon next rising edge of S1CLK at time t4, the WrData1 data value incremented to 1 is written into location 0b001 pointed to by incremented pointer WrPtr1[2:0].

Although operation may repeat in this manner for subsequent S1CLK cycles, an additional signal WrPtr1Range is plotted as a time bar between a time t3a before time t3 up to a time t3b after time t3 showing a possible skew range of the write pointer initially and over time. This time bar range may be compared to the read pointer valid time t0 determine whether skew adjustment is needed.

The next set of signals are plotted for the S1 read interface to illustrate reading data from the FIFO 240. S0CLK and CYCLE data (which is a duplicate of the WrData0 data) are repeated as timing references, in which S0CLK is used instead of S1CLK as the read clock as shown in FIG. 2. The plotted signals and values also include slice 1 first and second stage write pointer valid signals WrPtrValidS1_1 and WrPtrValidS2_1 of a second two-stage synchronizer located within the read logic 248 to eliminate metastability issues, a read pointer valid signal RdPtrValid1 generated by the synchronizer of the read logic 248 to indicate validity of the read pointer RdPtr1[n:0], a 3-bit version of the read pointer shown as RdPtr1[2:0], and RdData1 data indicating the data read from the FIFO 240 by the skew controller 260. RdPtrValid1 is initially de-asserted low and RdPtr1[2:0] is held at a binary value of 0b111 while RdPtrValid1 is low. RdData1 is initially shown shaded indicating unknown or "don't care" data.

In response to WrPtrValid1 being asserted high at time t2, the synchronizer within the read logic 248 asserts WrPtrValidS1_1 high at the next rising edge of S0CLK at time t3 and asserts WrPtrValidS2_1 high at the next rising edge of S0CLK at time t4. At time t4 in response to assertion of WrPtrValidS2_1, the RdPtrValid1 is asserted high to release the RdPtr1[2:0] to increment immediately and upon each subsequent rising edge of S0CLK in sequential cycles. At time t4, RdPtr1[2:0] wraps to point to location 0b000 of the FIFO 240. Upon the next rising edge of S0CLK at time t5, the RdData1 data value of 0 in FIFO 240 pointed to by read pointer RdPtr1[2:0] is read by the skew controller 260 from location 0b000. Operation may repeat in this manner for subsequent S0CLK cycles.

In this case for the training data, the RdData1 data value of 0 is read by the skew controller 260 as the SAMPLE1 value at time t5. As previously described with reference to FIG. 3, the RdData0 data value of 0 is also read by the skew controller 260 as the SAMPLE0 value at time t5. In this manner, the same training data sample value is read from slice 0 and slice 1 at the same time by the skew controller 260, so that no skew adjustment is necessary. In addition, WrPtr1Range time bar illustrates the time range over which the write edge may move relative to the read edge, and in this case, the entire range for the write edge between times t3a and t3b occurs earlier in time than the read edge at time t4, so that there is no synchronization race. When there is no second synchronizer race as shown, the write of the FIFO 240 occurs sufficiently ahead of the read of the same entry so any write data race issues are avoided.

FIG. 5 is a timing diagram illustrating reception of training data for slice 1 when the S0CLK and S1CLK signals are aligned and in which a first synchronizer race from FIFO reset to the write pointer valid signal occurs according to one embodiment. The transaction process shown in FIG. 5 is another possible example of skew timing that may occur in slice 1 operating in parallel with slice 0 for the same training data when S0CLK and S1CLK are substantially aligned. As previously described for FIG. 3, the skew controller 260 de-asserts FifoReset low at initial time t0 synchronous with a rising edge of S0CLK to enable the transmitted training data to be written into the FIFOs 220 and 240. In a similar manner as shown in FIG. 4, S1CLK is plotted going high at about time t0 (in alignment with S0CLK), and the WrData1 data is plotted as substantially aligned with WrData0. The plotted signals also include FifoResetS1_1 and FifoResetS2_2, WrPtrValid1, and WrPtr1[2:0]. Again, WrPtrValid1 is initially de-asserted low and WrPtr1[2:0] is held at the binary value of 0b000 while WrPtrValid1 is low.

In response to FifoReset being de-asserted low at time t0, the synchronizer of the write logic 244 immediately de-asserts FifoResetS1_1 low at time t0 and de-asserts FifoResetS2_1 low at the next rising edge of S1CLK at time t1. At time t1 in response to de-assertion of FifoResetS2_1, the WrPtrValid1 is asserted high to release the WrPtr1[2:0] to begin incrementing upon each subsequent rising edge of S1CLK in sequential cycles. Note that in this case as compared to the case shown in FIG. 4, the WrPtrValid1 is asserted high earlier by one cycle of S1CLK. At the next rising edge of S1CLK at time t2, a WrData1 data value of −1 is written into location 0b000 pointed to by WrPtr1[2:0], and upon next rising edge of S1CLK at time t3, a WrData1 data value of 0 is written into location 0b001 pointed to by incremented pointer WrPtr1[2:0].

Although operation may repeat in this manner for subsequent S1CLK cycles, WrPtr1Range is again plotted as a time bar, but this time between a time t2a before time t2 up to a time t2b after time t2 showing a possible range of the write pointer initially and over time. As described further below, this time bar range may be compared to the read pointer valid time t0 determine whether skew adjustment is used.

The next set of signals are plotted for the S1 read interface to illustrate reading data from the FIFO 240 in a similar manner as shown in FIG. 4. S0CLK and CYCLE are repeated as timing references, in which S0CLK is used instead of S1CLK as the read clock as shown in FIG. 2. The plotted signals and values also include WrPtrValidS1_1 and WrPtrValidS2_1 of the synchronizer of the write logic 244, RdPtrValid1, RdPtr1[2:0], and RdData1. Again, RdPtrValid1 is initially de-asserted low and RdPtr1[2:0] is held at a binary value of 0b111 while RdPtrValid1 is low, and RdData1 is initially shown shaded.

In response to WrPtrValid1 being asserted high at time t1, the synchronizer of the read logic 228 asserts WrPtrValidS1_1 high at the next rising edge of S0CLK at time t2 and asserts WrPtrValidS2_1 high at the next rising edge of S0CLK at time t3. At time t3 in response to assertion of WrPtrValidS2_1, the RdPtrValid1 is asserted high to release the RdPtr1[2:0] to increment immediately and upon each subsequent rising edge of S0CLK in sequential cycles. At time t3, RdPtr1[2:0] wraps to point to location 0b000 of the FIFO 240. At the next rising edge of S0CLK at time t4, an RdData1 data value of −1 in FIFO 240 pointed to by read pointer RdPtr1[2:0] is read from location 0b000. Upon the next rising edge of S0CLK at time t5, an RdData1 value of 0 in FIFO 240 pointed to by read pointer RdPtr1[2:0] is read from location 0b001. Operation repeats in this manner for subsequent S0CLK cycles.

In this case for the training data, the RdData1 data value of 0 is read by the skew controller 260 as the SAMPLE1 value at time t5 while an RdData0 data value of 0 is also read by the skew controller 260 as the SAMPLE0 value at the same time t5. In this manner, the same training data sample value is read from slice 0 and slice 1 at the same time by the skew controller 260, so that no skew adjustment is necessary. This is true even though RdPtr[2:0] has advanced early by one FIFO location within the FIFO 240 as compared to FIG. 4. In addition, WrPtr1Range time bar illustrates the time range over which the write edge may move relative to the read edge, and in this case, the entire range for the write edge between times t2a and t2b occurs earlier in time than the read edge at time t3, so that correct data occurs in spite of the first synchronization race. Even with the first synchronizer race, the write of the FIFO 240 occurs sufficiently ahead of the read of the same entry so any write data race issues are avoided.

FIG. 6 is a timing diagram illustrating reception of training data for slice 1 when the S0CLK and S1CLK signals are aligned in which a second synchronizer race from the write pointer valid signal to the read pointer valid signal occurs according to one embodiment. The process shown in FIG. 6 is yet another possible example of what may occur for slice 0 in parallel with the training data for slice 0 being written into the FIFO 220 and read by the skew controller 260 for slice 0 as shown in FIG. 3 when S0CLK and S1CLK are substantially aligned. The same signals shown plotted in FIGS. 4 and 5 are plotted in FIG. 6.

In response to FifoReset being de-asserted low at time t0, the synchronizer of the write logic 244 de-asserts FifoResetS1_1 low one S1CLK period later at time t1 and de-asserts FifoResetS2_1 low at the next rising edge of S1CLK at time t2. At time t2 in response to de-assertion of FifoResetS2_1, the WrPtrValid1 is asserted high to release the WrPtr1[2:0] to begin incrementing upon each subsequent rising edge of S1CLK in sequential cycles. Note that the initial timing in this case is similar to that shown in FIG. 4. At the next rising edge of S1CLK at time t3, the WrData1 value of 0 is written into location 0b000 pointed to by WrPtr1[2:0], and upon next rising edge of S1CLK at time t4, the WrData1 data value incremented to 1 is written into location 0b001 pointed to by incremented pointer WrPtr1[2:0].

Although operation may repeat in this manner for subsequent S1CLK cycles, an additional signal WrPtr1Range is plotted as a time bar between a time t3c before time t3 up to a time t3d after time t3 showing a possible range of the write pointer initially and over time. As described further below, this time bar range may be compared to the read pointer valid time t0 determine whether skew adjustment is used.

The next set of signals and values are plotted for the S1 read interface in a similar manner as shown in FIG. 4, in which S0CLK and CYCLE are repeated as timing references. The plotted signals also include WrPtrValidS1_1, WrPtrValidS2_1, RdPtrValid1, RdPtr1[2:0], and RdData1. Again, RdPtrValid1 is initially de-asserted low and RdPtr1[2:0] is held at a binary value of 0b111 while RdPtrValid1 is low, and RdData1 is initially shown shaded.

In response to WrPtrValid1 being asserted high at time t2, in this case the synchronizer of the read logic 228 immediately asserts WrPtrValidS1_1 high at time t2 and asserts WrPtrValidS2_1 high at the next rising edge of S0CLK at time t3. At time t3 in response to assertion of WrPtrValidS2_1, the RdPtrValid1 signal is asserted high to release the RdPtr1[2:0] to increment immediately and upon each subsequent rising edge of S0CLK in sequential cycles. At time t3, RdPtr1[2:0] wraps to point to location 0b000 of the FIFO 240. At the next rising edge of S0CLK at time t4, the RdData1 data value of 0 in FIFO 240 pointed to by read pointer RdPtr1[2:0] is read from location 0b000. Upon the next rising edge of S0CLK at time t5, the RdData1 data value of 1 in FIFO 240 pointed to by read pointer RdPtr1[2:0] is read from location 0b001. Operation repeats in this manner for subsequent S0CLK cycles.

In this case for the training data, the RdData1 data value of 1 is read by the skew controller 260 as the SAMPLE1 value at time t5 while the RdData0 data value of 0 is read by the skew controller 260 as the SAMPLE0 value at time t5. In this manner, a different training data sample value is read at the same time t5 by the skew controller 260, so that skew adjustment is necessary. In addition, the WrPtr1Range time bar illustrates that a portion of the write edge between times t3c and t3d occurs after the read edge at time t3, so that incorrect data may be read because of the second synchronization race.

In this case, the skew controller 260 indicates to the nudge logic 250 to nudge or delay the RdPtr1[2:0] data by 1 S0CLK period. Since only training data is involved, no substantive data is lost, and since the nudge is performed before substantive data is transferred, subsequent operation is correct and substantive data is correctly transmitted and received.

The following FIGS. 7 and 8 illustrate scenarios when S0CLK and S1CLK are unaligned such that the phase and skew (or the slice 0 and slice 1 delays) are not equal. Two different synchronizations are possible when S0CLK and S1CLK are unaligned, including negative skew in which the first synchronization is shorter than the second (FIG. 7), and positive skew in which the first synchronization is longer than the second (FIG. 8). For these cases, (E) waveforms represent an early, true negative skew condition, whereas (L) waveforms represent a late, false negative skew condition.

FIG. 7 is a timing diagram illustrating reception of training data for slice 1 when the S0CLK and S1CLK signals are not aligned such that the phase and skew (or the slice 0 and slice 1 delays) are not equal, illustrating negative skew in which the first synchronization is shorter than the second according to one embodiment. The transaction process illustrates possible examples of negative skew timing that may occur in slice 1 operating in parallel with slice 0 for the same training data when S0CLK and S1CLK are not aligned. Substantially the same signals are plotted as previously described relative to initial time t0 when the FifoReset signal is de-asserted low. As before, subsequent times t1, t2, t3, t4, t5, etc., track the corresponding rising edges of S0CLK used for the S1 read interface. A time t0+ after time t0 but before time t1 denotes the next rising edge of S1CLK, and subsequent times t1+, t2+, t3+, t4+, etc., track the corresponding rising edges of S1CLK for the S1 write interface.

In the negative skew scenario shown in FIG. 7, the slice 1 delay is minimized while the slice 0 delay is maximized as illustrated by an early data value WrData1_E. A corresponding early write pointer range WrPtr1Range_E is plotted as a time bar from time t2+ to a subsequent time t3m between times t3+ and t4+ illustrating a range over which the write edge may move over time.

In response to FifoReset being de-asserted low at time t0, the synchronizer of the write logic 244 de-asserts FifoResetS1_1 low upon the next rising edge of S1CLK at time t0+ and de-asserts FifoResetS2_1 low at the following rising edge of S1CLK at time t1+. At time t1+ in response to de-assertion of FifoResetS2_1, the WrPtrValid1 signal is asserted high to release the WrPtr1[2:0] to begin incrementing upon each subsequent rising edge of S1CLK in sequential cycles. At the next rising edge of S1CLK at time t2+, the WrData1 data value of 0 is written into location 0b000 pointed to by WrPtr1[2:0], and upon next rising edge of S1CLK at time t3+, the WrData1 data value incremented to 1 is written into location 0b001 pointed to by incremented pointer WrPtr1[2:0]. Operation may repeat in this manner for subsequent S1CLK cycles.

The next set of signals and values are plotted for the S1 read interface in a similar manner as shown in FIG. 5, in which S0CLK and CYCLE are repeated as timing references. The plotted signals also include WrPtrValidS1_1, WrPtrValidS2_1, RdPtrValid1, and RdPtr1[2:0]. RdData1 is replaced by RdData1_E corresponding with WrData1_E of the S1 write interface. Again, RdPtrValid1 is initially de-asserted low and RdPtr1[2:0] is held at a binary value of 0b111 while RdPtrValid1 is low, and RdData1_E is initially shown shaded.

In response to WrPtrValid1 being asserted high at time t1+, the synchronizer of the read logic 228 asserts WrPtrValidS1_1 high at time t2 and asserts WrPtrValidS2_1 high at the next rising edge of S0CLK at time t3. At time t3 in response to assertion of WrPtrValidS2_1, the RdPtrValid1 is asserted high to release the RdPtr1[2:0] to increment immediately and upon each subsequent rising edge of S0CLK in sequential cycles. At time t3, RdPtr1[2:0] wraps to point to location 0b000 of the FIFO 240. At the next rising edge of S0CLK at time t4, the RdData1_E data value of 0 in FIFO 240 pointed to by read pointer RdPtr1[2:0] is read from location 0b000. Upon the next rising edge of S0CLK at time t5, the RdData1 data value of 1 in FIFO 240 pointed to by read pointer RdPtr1[2:0] is read from location 0b001. Operation may repeat in this manner for subsequent S0CLK cycles.

In this case, the RdData1_E data value of SAMPLE1_E=1 is read by the skew controller 260 as the SAMPLE1 value at time t5 while the RdData0 data value of 0 is read by the skew controller 260 as the SAMPLE0 value at time t5. In this manner, a different training data sample value is read at the same time t5 by the skew controller 260 in a similar manner as shown in FIG. 6, so that skew adjustment is necessary. In addition, the WrPtr1Range_E time bar illustrates that a portion of the write edge between times t2+ and t3m occurs after the read edge at time t3, so that incorrect data may be read because of the second synchronization race.

In this case, the skew controller 260 indicates to the nudge logic 250 to nudge or delay the RdPtr1[2:0] data by 1 S0CLK period in a similar manner as shown in FIG. 6. Again, since only training data is involved, no substantive data is lost, and since the nudge is performed before substantive data is transferred, subsequent operation is correct and substantive data is correctly transmitted and received.

In addition, for this phase alignment shown in FIG. 7, a positive skew value can result in the same deskew FIFO synchronization. This case as illustrated by a late data value WrData1_L and a corresponding late write pointer range WrPtr1Range_L. WrPtr1Range_L is plotted as a time bar from time t1+ to a subsequent time t2m (between times t2+ and t3+) illustrating a range over which the write edge may move relative to the read edge at time t3. In this case, the entire range for the write edge appears earlier in time than the read edge, since t2m occurs before t3. The SAMPLE1 value read from the slice 1 FIFO 240 is from the RdData1_L data corresponding with WrData1_L of the S1 write interface. In this case for the training data, the RdData1_L data value of SAMPLE_L=0 is read by the skew controller 260 as the SAMPLE1 value at time t5, which is the same as the data value read from the slice 0 deskew FIFO 220 in the same cycle. In this manner, the same training data sample value is read from slice 0 and slice 1 at the same time by the skew controller 260, so that no skew adjustment is necessary. This is true even though RdPtr[2:0] has advanced early by one FIFO location within the FIFO 240.

For the case illustrated in FIG. 7, the (E) waveforms represent an early, true negative skew condition, whereas the (L) waveforms represent a late, false negative skew condition.

FIG. 8 is a timing diagram illustrating reception of training data for slice 1 when the S0CLK and S1CLK signals are not aligned such that the phase and skew (or the slice 0 and slice 1 delays) are not equal, illustrating positive skew in which the first synchronization is longer than the second according to one embodiment. The transaction process illustrates possible examples of positive skew timing that may occur in slice 1 operating in parallel with slice 0 for the same training data when S0CLK and S1CLK are not aligned. Substantially the same signals as shown in FIG. 7 are plotted relative to initial time t0 when the FifoReset signal is de-asserted low, except that write data values WrData1_E and WrData1_L are reversed, and the read data values RdData1_E and RdData1_L are also reversed. As before, subsequent times t1, t2, t3, t4, t5, etc., track the corresponding rising edges of S0CLK used for the S1 read interface. In this case, a time t1− after time t0 but before time t1 denotes the next rising edge of S1CLK, and subsequent times t2−, t3−, t4−, t5−, etc., track the corresponding rising edges of S1CLK for the S1 write interface.

In the positive skew scenario shown in FIG. 8, the slice 1 delay is maximized while the slice 0 delay is minimized as illustrated by the late data value WrData1_L. The corresponding late write pointer range WrPtr1Range_L is plotted as a time bar from a time t1n between times t1− and t2− to subsequent time t3−illustrating a range over which the write edge may move over time. In this case, the entire range for the write pointer edge appears earlier in time than the read pointer edge occurring at time t3. In addition, the data value SAMPLE1_L=0 is read by the skew controller 260 as the SAMPLE1 value from the slice 1 FIFO 240 of the RdData1_L data at time t5, which is the same as the data value read from the slice 0 FIFO 240 in the same cycle at time 5, so no skew alignment is necessary.

In addition, for this phase alignment shown in FIG. 8, a negative skew value can result in the same deskew FIFO synchronization. This case as illustrated by an early data value WrData1_E and a corresponding early write pointer range WrPtr1Range_E. WrPtr1Range_E is plotted as a time bar from time t2n between times t2− and t3− to subsequent time t4−illustrating a range over which the write edge may move relative to the read edge indicated by corresponding early read data RdData1_E. In this case, a portion of the entire range for the write edge appears after the read edge at time t3. In this case for the training data, a RdData1_R data value of SAMPLE1_E=1 is read by the skew controller 260 as the SAMPLE1 value at time t5, which is not the same as the data value read from the slice 0 deskew FIFO 220 in the same cycle. In this manner, different training data sample values are read by the skew controller 260 so that skew adjustment is necessary.

In this case, the skew controller 260 indicates to the nudge logic 250 to nudge or delay the RdPtr1[2:0] data by 1 S0CLK period, effectively shifting the entire range of the write edge earlier in time relative to the read edge and eliminating the write data race. Again, since only training data is involved, no substantive data is lost, and since the nudge is performed before substantive data is transferred, subsequent operation is correct and substantive data is correctly transmitted and received.

For the case illustrated in FIG. 8, the (L) waveforms represent a late, true positive skew condition, while the (E) waveforms represent an early, false positive skew condition.

In each of the skew scenarios described, the skew controller 260 detects the RdPtrValid0 signal asserted for slice 0 and latches the SAMPLE0 and SAMPLE1 data values from the FIFOs 220 and 240, respectively. The initial data in these skew FIFOs before training data transmission and the training data is such that the skew controller 260 compares the SAMPLE0 and SAMPLE1 data values to determine the appropriate response. When the sample values are equal, then skew adjustment is not needed and not performed. When SAMPLE1 is greater than SAMPLE0 such that slice 1 is ahead of slice 0, then the skew controller 260 indicates to the nudge logic 250 to delay the RdPtr1[n:0] by at least one S0CLK period. When SAMPLE1 is less than SAMPLE0 such that slice 1 is behind slice 0, then the skew controller 260 indicates to the nudge logic 230 to delay the RdPtr0[n:0] by at least one S0CLK period. The number of S0CLK period of delay may be based on the numeric difference between the SAMPLE0 and SAMPLE1 data values. When the training data is configured such that sequential values are separated by 1, then the difference between the sample values determines a corresponding number of S0CLK periods for the delay. It is noted, however, that implementations should be configured to limit the maximum delay to no more than 2 S0CLK periods to avoid increasing the size of the FIFOs 220 and 240.

The synchronizer race scenarios are degenerate cases of the two unaligned scenarios. In particular, the first synchronizer race scenario corresponds to unaligned negative skew scenario, while the second synchronizer race scenario corresponds to the unaligned positive skew scenario. In the cases where synchronization occurs when the skew is negative, a write data race issue is possible between the assertion of the read pointer valid signal and the eventual nudge that adjusts the read pointer. It is noted that if the skew is greater than or equal to zero when the deskew FIFO synchronization occurs, a write data race cannot occur and no skew alignment is required. If the skew is less than zero (including the second synchronizer race scenario) when the deskew FIFO synchronization occurs, a write data race can occur and skew alignment is necessary. Skew alignment is only ever required on slice 1, and the only adjustment required is delaying the slice 1 read pointer by one cycle. Once the skew alignment is performed, a write data race can no longer occur.

Due to drift after the deskew FIFO synchronization, there is a small possibility that a write data race may occur when the sample for skew alignment is taken. This race can be eliminated with the following modification to the D2D initialization sequence. First, after the RX interface enters the RX_TRAIN state for skew alignment, increase the delay of the slice 1 deskew FIFO by one cycle before taking the sample. Second, during the RX_TRAIN state for skew alignment, decrease the delay of the slice 1 deskew FIFO by one cycle if the read values are not equal (i.e., the slice 1 value is later than the slice 0 value).

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A die-to-die (D2D) interface between a plurality of chiplets of a system on a chip (SoC), in which each of the chiplets are subdivided into a plurality of slices, the D2D interface comprising:
   a transmission interface coupled between first and second chiplets comprising a first transmission path for a first slice and a second transmission path for a second slice; and
   the first chiplet comprising receive circuitry, the receive circuitry comprising:
      a write interface that stores data received from the first transmission path into a first first-in, first out (FIFO) using a first clock signal received via the first transmission path, and that stores data received from the second transmission path into a second FIFO using a second clock signal received via the second transmission path; and
      a read interface that reads data stored in the first and second FIFOs by clocking the data out using the first clock signal.

2. The D2D interface of claim 1, wherein the first and second transmission paths of the transmission interface are subject to different delays.

3. The D2D interface of claim 1, wherein the receive circuitry comprises:

a first write counter that provides a first write pointer to the first FIFO, wherein the first write counter has a clock input receiving the first clock signal;

a first read counter that provides a first read pointer to the first FIFO, wherein the first read counter has a clock input receiving the first clock signal;

a second write counter that provides a second write pointer to the second FIFO, wherein the second write counter has a clock input receiving the second clock signal; and a second read counter that provides a second read pointer to the second FIFO, wherein the second read counter has a clock input receiving the first clock signal.

4. The D2D interface of claim 3, further comprising a skew controller with a comparator that is configured to compare a first sample of first data from the first FIFO pointed to by the first read pointer with a second sample of the duplicate first data from the second FIFO pointed to by the second read pointer to determine skew adjustment.

5. The D2D interface of claim 4, further comprising nudge logic that is configured to delay the second read pointer when the comparison indicates that second FIFO is ahead of the first FIFO.

6. The D2D interface of claim 4, further comprising nudge logic that is configured to delay the first read pointer when the comparison indicates that the first FIFO is ahead of the second FIFO.

7. The D2D interface of claim 4, wherein the first data and the duplicate first data each comprise incremental training data values indicative of clock cycle transitions, further comprising nudge logic that is configured to delay one of the first and second read pointers by a number of clock cycles based on a difference between the first and second samples.

8. A method of transferring data in a die-to-die (D2D) interface between a plurality of chiplets of a system on a chip (SoC), wherein each of the chiplets are subdivided into a plurality of slices, and wherein the D2D interface includes a transmission interface coupled between first and second chiplets comprising a first transmission path for a first slice and a second transmission path for a second slice, the method comprising:

storing data received from the first transmission path into a first first-in, first out (FIFO) using a first clock signal received via the first transmission path;

storing data received from the second transmission path into a second FIFO using a second clock signal received via the second transmission path;

reading data stored in the first FIFO by clocking the data out using the first clock signal; and reading data stored in the second FIFO by clocking the data out using the first clock signal.

9. The method of claim 8, wherein the first and second transmission paths of the transmission interface are subject to different delays.

10. The method of claim 8, further comprising:

providing a first write counter for providing a first write pointer to the first FIFO, wherein the first write counter has a clock input receiving the first clock signal;

providing a first read counter for providing a first read pointer to the first FIFO, wherein the first read counter has a clock input receiving the first clock signal;

providing a second write counter for providing a second write pointer to the second FIFO, wherein the second write counter has a clock input receiving the second clock signal; and providing a second read counter for providing a second read pointer to the second FIFO, wherein the second read counter has a clock input receiving the first clock signal.

11. The method of claim 10, further comprising determining skew adjustment by comparing a first sample of first data from the first FIFO pointed to by the first read pointer with a second sample of the duplicate first data from the second FIFO pointed to by the second read pointer.

12. The method of claim 11, further comprising delaying the second read pointer when the comparing indicates that second FIFO is ahead of the first FIFO.

13. The method of claim 11, further delaying the first read pointer when the comparing indicates that the first FIFO is ahead of the second FIFO.

14. The method of claim 11, further comprising:

transmitting duplicate incremental training data values indicative of clock cycle transitions across the first and second transmission paths, wherein the first data and the duplicate first data comprise duplicate incremental training data values; and delaying one of the first and second read pointers by a number of clock cycles based on a difference between the first and second samples.

15. A die-to-die (D2D) interface between a plurality of chiplets of a system on a chip (SoC), in which each of the chiplets are subdivided into a plurality of slices, the D2D interface comprising:

a transmission interface coupled between first and second chiplets comprising a first transmission path for a first slice and a second transmission path for a second slice; and the first chiplet comprising receive circuitry, the receive circuitry comprising:

a first write interface that stores data received from the first transmission path into a first first-in, first out (FIFO) using a first clock signal received via the first transmission path;

a second write interface that stores data received from the second transmission path into a second FIFO using a second clock signal received via the second transmission path;

a first read interface that reads data stored in the first FIFO by clocking the data out using the first clock signal; and a second read interface that reads data stored in the second FIFO by clocking the data out using the first clock signal.

16. The D2D interface of claim 15, wherein the first and second transmission paths of the transmission interface are subject to different delays.

17. The D2D interface of claim 15, wherein the receive circuitry comprises:

a first write counter that provides a first write pointer to the first FIFO, wherein the first write counter has a clock input receiving the first clock signal;

a first read counter that provides a first read pointer to the first FIFO, wherein the first read counter has a clock input receiving the first clock signal;

a second write counter that provides a second write pointer to the second FIFO, wherein the second write counter has a clock input receiving the second clock signal; and a second read counter that provides a second read pointer to the second FIFO, wherein the second read counter has a clock input receiving the first clock signal.

18. The D2D interface of claim 17, further comprising a skew controller with a comparator that is configured to determine skew adjustment by comparing a first sample of first data from the first FIFO pointed to by the first read pointer with a second sample of the duplicate first data from the second FIFO pointed to by the second read pointer.

19. The D2D interface of claim 18, further comprising nudge logic that is configured to delay the second read pointer when the comparison indicates that second FIFO is ahead of the first FIFO and to delay the first read pointer when the comparison indicates that the first FIFO is ahead of the second FIFO.

20. The D2D interface of claim 18, wherein the first data and the duplicate first data each comprise incremental training data values indicative of clock cycle transitions, further comprising nudge logic that is configured to delay one of the first and second read pointers by a number of clock cycles based on a difference between the first and second samples.

* * * * *